A. F. Cushman.
Lathe Chuck.

Nº 51,384. Patented Dec. 5, 1865.

Witnesses:

Inventor:
A. F. Cushman
By Munn & Co.
Attys

UNITED STATES PATENT OFFICE.

A. F. CUSHMAN, OF HARTFORD, ASSIGNOR TO THE WARWICK TOOL COMPANY, OF MIDDLETOWN, CONNECTICUT.

IMPROVEMENT IN SCROLL-CHUCKS.

Specification forming part of Letters Patent No. 51,384, dated December 5, 1865.

*To all whom it may concern:*

Be it known that I, A. F. CUSHMAN, of Hartford, in the county of Hartford and State of Connecticut, have invented a new and Improved Scroll-Chuck; and I do hereby declare that the following is a full, clear, and exact description thereof, which will enable others skilled in the art to make and use the same, reference being had to the accompanying drawings, forming part of this specification, in which—

Figure 1:
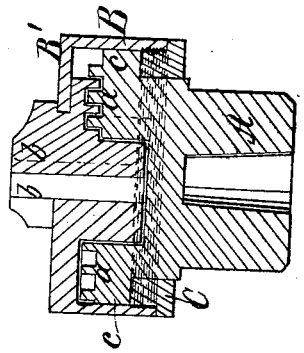
Figure 2:
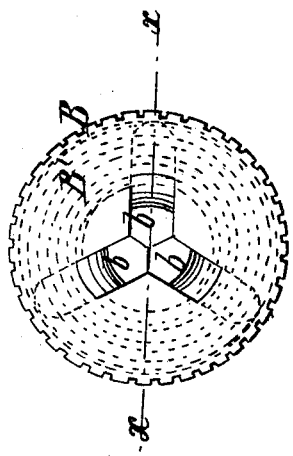
Figure 3:
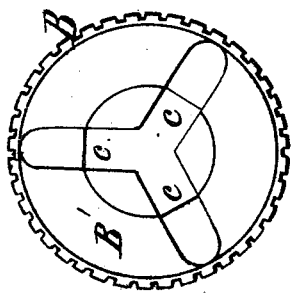

Figure 1 is a longitudinal central section of this invention, the line $x\ x$, Fig. 2, indicating the plane of section. Fig. 2 is a face view of the same. Fig. 3 is an inside view of the revolving cap which carries the jaws detached.

Similar letters of reference indicate like parts.

This invention consists in combining the jaws of a scroll-chuck with a revolving cap and stationary scroll in such a manner that by turning the cap a double motion is imparted to said jaws—viz., a revolving motion with said cap and a radially-sliding motion by the action of the scroll; and by these means said jaws are rendered self-tightening—that is to say, if a drill, for instance, is placed between them and the point of the drill begins to act, imparting to it a tendency to turn in the jaws, the effect is to tighten the jaws and the liability of a spontaneous disengagement of said drill or other tool or piece of work held between the jaws is avoided.

The scroll in this new chuck is completely inclosed in a case, which is formed by the revolving cap and a nut screwed in its open end, and by these means said scroll is protected against dirt or impurities; and, furthermore, the jaws can be made to project beyond the outer surface of the cap, which is of great convenience in drilling or in turning small screws or other articles.

A represents the head of the chuck, which may be secured to the end of the mandrel by being screwed thereon or by any other suitable means. Upon the front end or face of this head A the scroll $a$ is cut. Three jaws, $b$, are provided, of the form shown in Fig. 1, having teeth $e$ projecting from the rear side of the radial arm, as shown in Fig. 1, to engage with the scroll on the face of A.

B represents a cap, made to fit over the head A, having a radial flange, B', projecting inward at its outer end, with a circular opening at its center, as shown in Fig. 3, which is a face view of said cap B. In the flange B' three radial slots are cut, as shown in Fig. 3, of proper size to permit the projecting portion of the jaws $b$ to move therein.

The jaws $b$ being placed in position against the face of A, the cap B is slipped on over the jaws and head A, where it is secured by the collar C being screwed into it on the back side of the projection $c$ of head A, as shown in Fig. 1. By turning the cap B the jaws $b$, working in the slots $c$ of flange B', are carried around with the cap, and are at the same time operated upon by the scroll $a$, thereby causing the jaws to move to or from the center, according as the cap B is turned in one or the other direction.

The scroll is so formed as to drive the jaws toward the center when the cap B is turned from the rest or tool, by which means the chuck is made self-tightening, as it is obvious that when the chisel or other tool is applied to the article held by the chuck it will have a tendency to turn the jaws and the cap away from the rest or tool, and thus tighten more firmly the hold of the jaws upon the article held between them. By these means I avoid the use of any tool for tightening up the chuck, whereby much time is saved, especially when working upon small articles, for which these chucks are especially intended.

For the purpose of giving to the jaws a long bearing-face, so as to hold the article firmly between them and prevent it from "chattering" or getting out of line, the front ends of the jaws are made to project outward beyond the face of the cap, as shown in Fig. 1. By this arrangement two other objects are also accomplished; first, the force of the scroll is exerted upon the jaws at a point about midway of their length, whereby they are prevented from tilting or binding, and are caused to hold the article more firmly, and at the same time permits the tool to be brought nearer to the point where the article is held firmly by the jaws, especially when the handle of the tool is inclined toward the head, as is often necessary.

By inclosing the scroll and the arms of the jaws within the cap B, as shown, I prevent dirt or dust from getting into it and obstruct its working.

Having thus fully described my invention, what I claim is—

1. The head A, having the scroll $a$ on its face, in combination with the jaws $b$ and cap B, constructed and operating substantially as shown and described.

2. The cap B, provided with the flange B', having the radial slots therein, in combination with the collar C, head A, and jaws $b$, as and for the purpose set forth.

A. F. CUSHMAN.

Witnesses:
M. M. LIVINGSTON,
C. L. TOPLIFF.